United States Patent
Lai

(10) Patent No.: US 9,122,336 B1
(45) Date of Patent: Sep. 1, 2015

(54) CONDUCTIVE ELECTRODE STRUCTURE

(71) Applicant: T-KINGDOM CO., LTD., Taoyuan County (TW)

(72) Inventor: Yu Hao Lai, Taoyuan County (TW)

(73) Assignee: T-KINGDOM CO., LTD., Taoyuan County (TW)

( * ) Notice: Subject to any disclaimer, the term of this patent is extended or adjusted under 35 U.S.C. 154(b) by 0 days.

(21) Appl. No.: 14/451,918

(22) Filed: Aug. 5, 2014

(51) Int. Cl.
*H01L 27/10* (2006.01)
*G06F 3/041* (2006.01)
*G06F 3/044* (2006.01)

(52) U.S. Cl.
CPC ............... *G06F 3/041* (2013.01); *G06F 3/044* (2013.01)

(58) Field of Classification Search
CPC .................................. G06F 3/041; G06F 3/044
See application file for complete search history.

(56) References Cited

U.S. PATENT DOCUMENTS

2015/0022743 A1 * 1/2015 Takao et al. ..................... 349/12

FOREIGN PATENT DOCUMENTS

JP 2014-S07199 * 10/2014

* cited by examiner

*Primary Examiner* — Long Pham
(74) *Attorney, Agent, or Firm* — Rabin & Berdo, P.C.

(57) ABSTRACT

A conductive electrode structure includes a substrate layer; at least one adhesion layer formed on the substrate layer for forming a circuit pattern; a conductive electrode layer formed on the adhesion layer for forming a conducting circuit corresponding to the circuit pattern; a first blackened layer formed on the conductive electrode layer corresponding to the circuit pattern and manufactured with an easily etched material; and a weatherproof layer formed on the first blackened layer and manufactured with an etch-resistant material. The weatherproof layer has a thickness smaller than the first blackened layer. The first blackened layer has a dark color for absorbing and stopping light from entering into the conductive electrode layer, and accordingly forms a shielding surface that prevents the conductive electrode layer from being directly visually perceived by a user. The conductive electrode structure also avoids side etching of the conductive electrode layer to ensure increased yield rate.

11 Claims, 8 Drawing Sheets

CONDUCTIVE ELECTRODE STRUCTURE

FIELD OF THE INVENTION

The present invention relates to a conductive electrode structure, and more particularly to a conductive electrode structure that includes easily etched blackened layers and a very thin weatherproof layer to not only reduce the interference phenomenon of the moiré effect, making a touchscreen using the conductive electrode structure more comfortable for viewing, but also effectively reduce the side etching of a conductive electrode layer to ensure a uniform width of the very fine conducting circuit formed of the conductive electrode layer.

BACKGROUND OF THE INVENTION

In response to the development of compact and light weight electronic information products, the semiconductor manufacturing process is now aimed to enable high-density and automated production. On the other hand, the currently available electronic information products or devices are designed to have a touch sensing surface or touchscreen that is gradually increased in size. As a result, the conductive electrodes for the touchscreen originally made of an indium tin oxide (ITO) material are now replaced by metal conductive electrodes.

Please refer to FIGS. 1 and 2 that show the manufacturing process and the structure of conventional metal conductive electrodes 10. In a first step, a metal conductive electrode layer for forming the main bodies of the metal conductive electrodes 10 is adhered to a substrate 12 via at least one adhesion layer 11, which is also referred to as a bonding layer, so that the metal conductive electrodes 10 formed later do not easily separate from the substrate 12. In a second step, at least one weatherproof layer 13, which is also referred as an anti-corrosion layer, is covered on the metal conductive electrode layer.

Please refer to FIG. 3, the adhesion layer 11 for the conventional metal conductive electrodes 10 includes two sub-layers, namely, an intermediate layer 110 connected to the substrate 12 and an electrically conductive seed layer 111 connected to the metal conductive electrodes 10.

In a third step as shown in FIG. 1, a wet etching process using an etching fluid is conducted, so that the weatherproof layer 13, the metal conductive electrode layer for forming metal conductive electrodes 10, and the adhesion layer 11 are etched to form an electrode circuit 14 consisting of a plurality of metal conductive electrodes 10. Finally, after a sensor with the metal conductive electrodes is obtained, the entire surface of the electrode circuit 14 is covered with an optically clear adhesive (OCA) film 16 to protect the sensor against damage.

To avoid the metal conductive electrodes 10 formed on a substrate of the touchscreen from being visually perceived by a user, it is a target of the research and development engineers in the touchscreen industry to develop metal conductive electrodes 10 having a very small width.

More specifically, the electrode circuit 14 on the conventional sensor is protected by the etch-resistant weatherproof layer 13 and is formed through the wet etching process. The wet etching is isotropic. Since the weatherproof layer 13 is formed of an etch-resistant material, there is a relatively large difference between the etching rates of the etching fluid on the weatherproof layer 13 and on the metal conductive electrode layer for forming the metal conductive electrodes 10. Moreover, the weatherproof layer 13 formed in the second step usually has a non-uniform thickness. As a result, when the etching fluid vertically etches the weatherproof layer 13, the metal conductive electrode layer and the adhesion layer 11, a serious side etching 15 will occur on the metal conductive electrodes 10 during the wet etching process.

In other words, when being viewed sidewardly as shown FIG. 1, the side etching 15 tends to occur on the lateral surfaces of the metal conductive electrodes 10 so formed, particularly when the metal conductive electrodes 10 have a designed width smaller than 5 μm and a designed thickness larger than 0.3 μm. As a result, the total etched surface on each of the metal conductive electrodes 10 is too large in proportion to the total area thereof, and the metal conductive electrodes 10 are unevenly etched to result in increased electric impedance of the electrode circuit 14. In some worse conditions, the electrode circuit 14 formed of the metal conductive electrodes 10 will break locally. Therefore, the metal conductive electrodes 10 are not easily controllable in quality and have low yield rate to form a tough problem in manufacturing very fine conductive electrodes.

In view of the disadvantages of the conventional metal conductive electrodes 10 for touchscreen, it is tried by the inventor to develop an improved conductive electrode structure, so that conductive electrodes thereof are not easily visually perceived by a user and do not have the problem of forming an electrode circuit with non-uniform width due to side etching, enabling increased yield rate of the conductive electrode structure.

SUMMARY OF THE INVENTION

A primary object of the present invention is to provide a conductive electrode structure that includes at least one blackened layer formed of an easily etched material, so that side etching of a conductive electrode layer can be reduced in the wet etching process for manufacturing the conductive electrode structure to increase yield rate, ensure uniform width of the very fine conducting circuit formed of the conductive electrode layer, and enable a touchscreen using the conductive electrode structure of the present invention to present good light transmittance and increased color saturation.

Another object of the present invention is to provide the above conductive electrode structure that further includes a weatherproof layer having a small or very small thickness compared to the weatherproof layer in the conventional conductive electrode structure. With the very thin weatherproof layer and the easily etched blackened layer, the side etching of the conductive electrode layer can be effectively reduced to ensure increased yield rate and uniform width of the very fine conducting circuit formed of the conductive electrode layer.

A further object of the present invention is to provide a conductive electrode structure that includes at least one blackened layer, so as to prevent the conductive electrode structure beneath a touchscreen from being directly visually perceived by a user and to effectively reduce color cast and the interference phenomenon of the moiré effect, making the touchscreen more comfortable for viewing.

To achieve the above and other objects, the conductive electrode structure according to the present invention includes a substrate layer; at least one adhesion layer formed on the substrate layer for forming a circuit pattern; a conductive electrode layer formed on the adhesion layer for forming a conducting circuit corresponding to the circuit pattern; a first blackened layer formed on the conductive electrode layer corresponding to the circuit pattern and manufactured with an easily etched material; and a weatherproof layer formed on the first blackened layer and manufactured with an etch-resistant material.

In the present invention, to minimize the thickness of the weatherproof layer for reducing the side etching of the conductive electrode layer, the weatherproof layer has a thickness smaller than that of the first blackened layer. That is, the thickness of the weatherproof layer is small or very small compared to the first blackened layer, while the first blackened layer has a thickness similar to that in the conventional conductive electrode structure.

Further, the first blackened layer is manufactured with a material in a dark color, so that light does not reflected, refracted from the weatherproof layer and the first blackened layer to cause color cast. Meanwhile, since light is absorbed by the first blackened layer without entering into the conductive electrode layer, the first blackened layer forms a shielding surface that prevents the conductive electrode layer from being directly visually perceived by a user.

The weatherproof layer is also manufactured with a material in a dark color, and can therefore form another shielding surface to prevent the conductive electrode layer from being directly visually perceived by a user.

According to a preferred embodiment, the conducting circuit formed of the conductive electrode layer presents a grid-shaped structure.

According to the present invention, the adhesion layer can have three different structural configurations.

In the first structural configuration, the adhesion layer includes an intermediate layer formed on the substrate layer, an electrically conductive seed layer formed on the intermediate layer, and an anti-oxidation layer formed on the seed layer.

In the second structural configuration, the adhesion layer includes a second blackened layer formed on the substrate layer, an intermediate layer formed on the second blackened layer, and an electrically conductive seed layer formed on the intermediate layer.

In the third structural configuration, the adhesion layer includes a second blackened layer formed on the substrate layer, an intermediate layer formed on the second blackened layer, an electrically conductive seed layer formed on the intermediate layer, and an anti-oxidation layer formed on the seed layer.

The adhesion layer can be formed of a metal material, a metal oxide material, a polymeric material, or any composite material thereof. The metal material for forming the adhesion layer can be tungsten (W), nickel (Ni), chromium (Cr), copper (Cu), vanadium (V), molybdenum (Mo), tin (Sn), zinc (Zn), cobalt (Co), iron (Fe), titanium (Ti), aluminum (Al), niobium (Nb), or any alloy thereof; and the metal oxide material for forming the adhesion layer can be an oxide of tungsten, nickel, chromium, copper, vanadium, molybdenum, tin, zinc, cobalt, iron, titanium, aluminum, niobium, or any alloy thereof.

According to the present invention, the conductive electrode layer can be formed of a metal material, such as gold (Au), copper (Cu), silver (Ag), zinc (Zn), aluminum (Al), nickel (Ni) or tin (Sn), or any alloy thereof; or can be formed of an electrically conductive polymeric material.

According to the present invention, the weatherproof layer can be formed of graphite, a metal material, a metal oxide material, an electrically conductive polymeric material, or any composite material thereof. The metal material for forming the weatherproof layer can be tungsten (W), nickel (Ni), chromium (Cr), copper (Cu), aluminum (Al), silver (Ag), titanium (Ti), molybdenum (Mo), tin (Sn), zinc (Zn), cobalt (Co), iron (Fe), niobium (Nb), and any alloy thereof; and the metal oxide material for forming the weatherproof layer can be an oxide of tungsten, nickel, chromium, copper, aluminum, sliver, titanium, molybdenum, tin, zinc, cobalt, iron, niobium, or any alloy thereof.

According to the present invention, the adhesion layer has a thickness ranged between 0.01 μm and 1 μm; the conductive electrode layer has a thickness ranged between 0.1 μm and 6 μm; the weatherproof layer has a thickness ranged between 2 nm and 50 nm; and the first blackened layer has a thickness ranged between 0.01 μm and 1 μm.

The present invention is characterized in that the weatherproof layer has a thickness smaller or extremely smaller than that of the first blackened layer; the blackened layer and the weatherproof layer are manufactured with dark-color material to provide blackening effect, and they together completely shield the conducting circuit formed of the conductive electrode layer to largely reduce the interference phenomenon of the moiré effect, making the touchscreen using the present invention more comfortable for viewing; and, the adhesion layer with at least one blackened layer and the very thin weatherproof layer work together to effectively reduce the side etching of the conductive electrode layer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
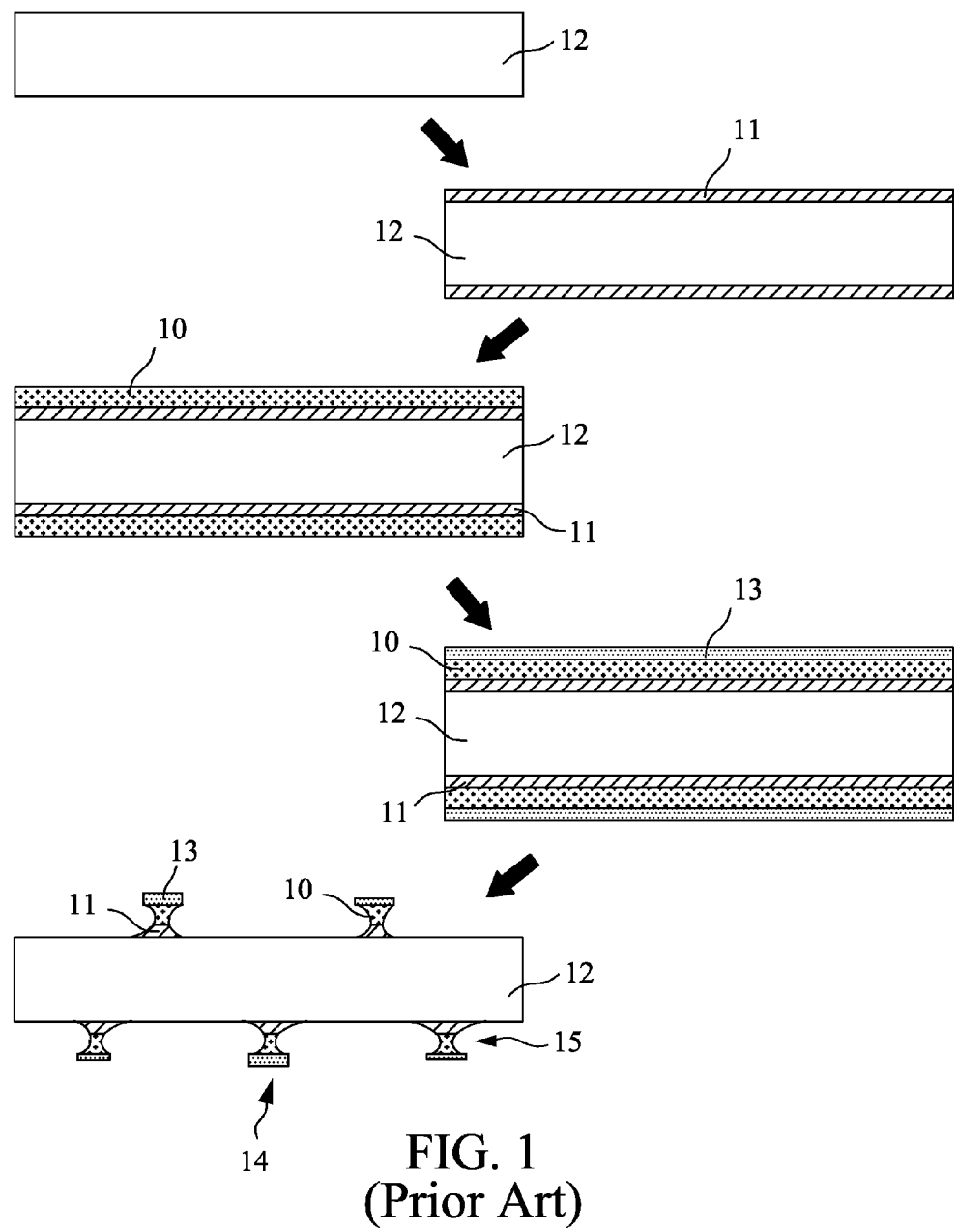
FIG. 1 is a pictorial description of the steps included in a conventional method of manufacturing conductive electrodes.

The present invention will now be described with some preferred embodiments thereof and by referring to the accompanying drawings. For the purpose of easy to understand, elements that are the same in the preferred embodiments are denoted by the same reference numerals.

Figure 4A:
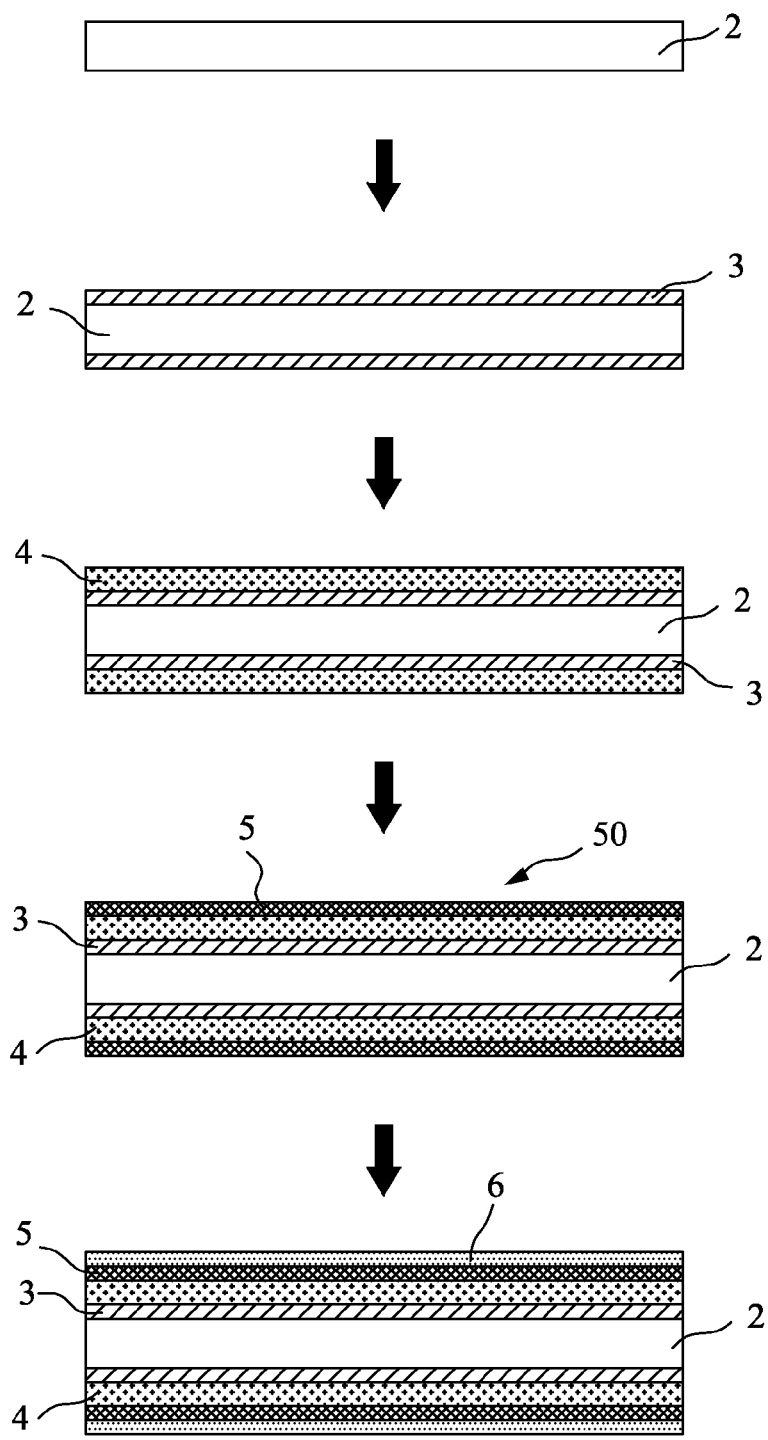
FIGS. 4A and 4B are a pictorial description of the steps for manufacturing the conductive electrode structure of the present invention.
Figure 4B:
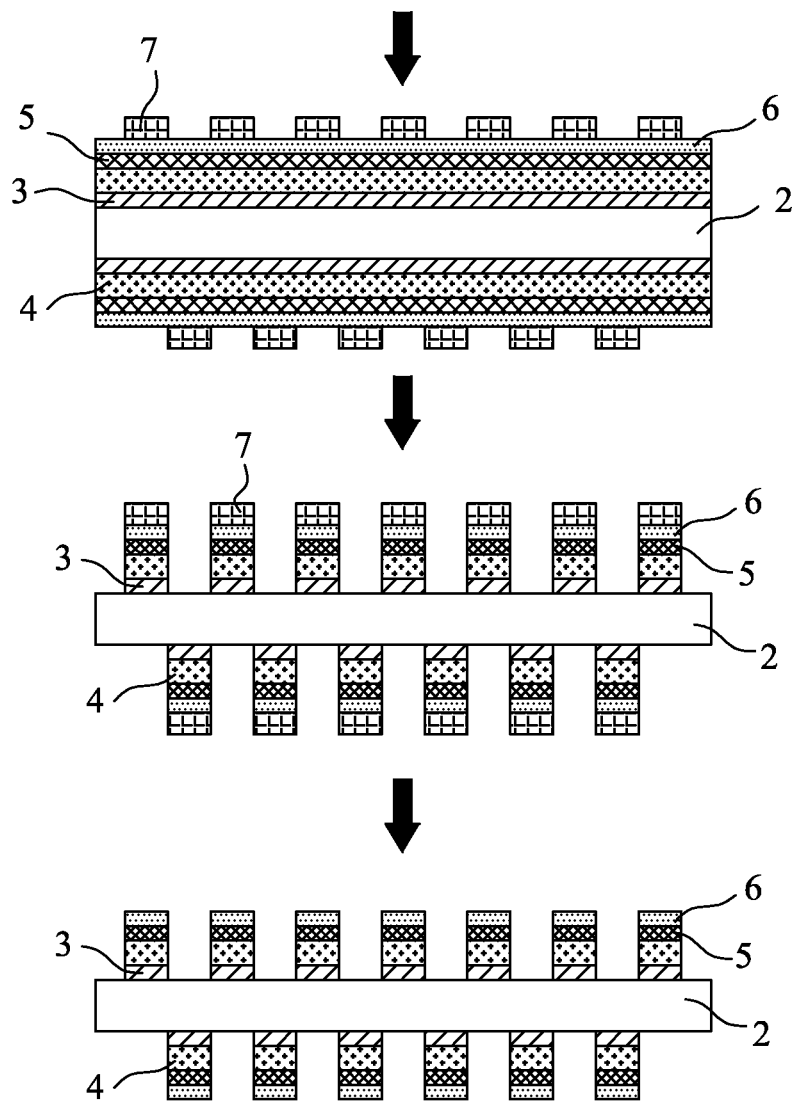

Please refer to FIGS. 4A and 4B that are pictorial description of steps for manufacturing a conductive electrode structure according to a preferred embodiment of the present invention. The following is a detailed description of these steps, which are numbered from (A) to (F) herein for ease of reference.

Step (A): Select a predetermined substrate material and use the same to form a substrate layer 2. The substrate layer 2 can be formed of a soft material or a glass sheet. The soft material for forming the substrate layer 2 can be polyethylene terephthalate (PET), poly(methyl methacrylate) (PMMA), polycarbonate (PC), poly(phenylene sulfone) (PPSU), polyethylenimine (PEI) or polyimide (PI).

Step (B): Form at least one electrically conductive adhesion layer 3 on the substrate layer 2. The adhesion layer 3 has a thickness ranged between 0.01 μm and 1 μm, and can be formed through vacuum sputtering, chemical deposition, polymer coating, or any combination thereof. And, the adhesion layer 3 can be formed of a metal material, a metal oxide material, a polymeric material, or any composite material thereof.

The metal material for forming the adhesion layer 3 can be tungsten (W), nickel (Ni), chromium (Cr), copper (Cu), vanadium (V), molybdenum (Mo), tin (Sn), zinc (Zn), cobalt (Co), iron (Fe), titanium (Ti), aluminum (Al), niobium (Nb), or any alloy thereof. The metal oxide material for forming the adhesion layer 3 can be an oxide of tungsten, nickel, chromium, copper, vanadium, molybdenum, tin, zinc, cobalt, iron, titanium, aluminum, niobium, or any alloy thereof.

Step (C): form an electrically conductive electrode layer 4 on the adhesion layer 3. The conductive electrode layer 4 can be formed through vacuum sputtering, vapor deposition, chemical deposition, electroplating, conductive polymer coating, or any combination thereof. And, the conductive electrode layer 4 can be formed of gold (Au), copper (Cu), silver (Ag), zinc (Zn), aluminum (Al), nickel (Ni), tin (Sn), or any alloy thereof; or can be formed of an electrically conductive polymeric material.

Step (D): Form a first blackened layer 5 on the conductive electrode layer 4. The first blackened layer 5 is formed of a material that is easily etched with an etching fluid, and can be formed through electroplating or sputtering deposition, so that an oxidizable metal material or a polymeric material in a dark color is coated on the conductive electrode layer 4 to form the first blackened layer 5. Alternatively, a material not in a dark color can be darkened through a chemically dyeing process and be used to form the first blackened layer 5.

The dark color of the first blackened layer 5 can be a color close to blue, green, purple brown or black to facilitate absorption of light reflected or refracted from a product, i.e. a touchscreen, so that external light almost does not reach the conductive electrode layer 4 located below the first blackened layer 5. Therefore, the first blackened layer 5 effectively reduces the interference phenomenon of the moiré effect, and the conductive electrode layer 4 is not easily visually perceived by a user who is using the touchscreen, making the touchscreen more comfortable for viewing.

Step (E): Form a weatherproof layer 6 on the first blackened layer 5. The weatherproof layer 6 is formed of a material that is not easily etched with an etching fluid, and can be formed through chemical deposition, electroplating, conductive polymer coating, or any combination thereof. The material for forming the weatherproof layer 6 can be graphite, a metal material, a metal oxide material, an electrically conductive polymeric material, or any composite material thereof.

The metal material for forming the weatherproof layer 6 can be tungsten (W), nickel (Ni), chromium (Cr), copper (Cu), aluminum (Al), silver (Ag), titanium (Ti), molybdenum (Mo), tin (Sn), zinc (Zn), cobalt (Co), iron (Fe), niobium (Nb), or any alloy thereof. The metal oxide material for forming the weatherproof layer 7 can be an oxide of tungsten, nickel, chromium, copper, aluminum, sliver, titanium, molybdenum, tin, zinc, cobalt, iron or niobium, or any alloy thereof.

Further, the weatherproof layer 6 can be configured to have a dark color. In other words, the first blackened layer 5 and the weatherproof layer 6, with a total thickness thereof, together form a shielding surface 50 capable of preventing the conductive electrode layer 4 from being visually perceived by users. More specifically, since the first blackened layer 5 and the weatherproof layer 6 all have a dark color to provide blackening effect, the weatherproof layer 6 can be designed to have a small or very small thickness compared to the conventional weatherproof layer 13 and the first blackened layer 5 of the present invention. In an embodiment of the present invention, the first blackened layer 5 has a thickness similar to that of the conventional weatherproof layer 13 and ranged between 0.01 μm and 1 μm, and the weatherproof layer 6 has a thickness much smaller than that of the conventional weatherproof layer 13.

Figure 5:
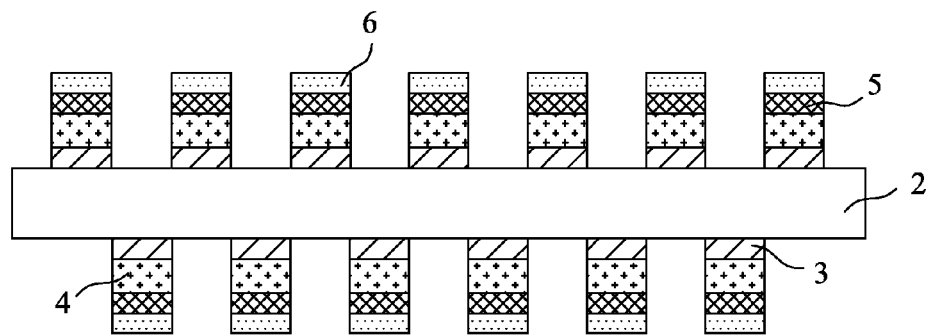
FIG. 5 is a structural view of the conductive electrode structure according to the present invention.

Step (F): Provide a masking layer 7 having a predetermined circuit pattern on the weatherproof layer 6 and then etch the masking layer 7 with an etching fluid through a wet etching process, so as to form a continuous or a non-continuous grid-shaped circuit pattern. Thereafter, release the masking layer 7 to form a preliminary conductive electrode structure, as shown in FIG. 5.

With the step (A) to (F), the conductive electrode layer 4 with conducting circuit can be formed on one side of the substrate layer 2. To form the conductive electrode layer 4 on two sides or multiple sides of the substrate layer 2, simply repeat the above steps (A) to (F). That is, the steps (A) to (F) can be repeated or changed according to actually required product design.

Moreover, in the present invention, the first blackened layer 5 and the conductive electrode layer 4 are designed to have the same etching rate, so that the possibility of forming side etching on the conductive electrode layer 4 can be largely reduced in the wet etching process. Therefore, the conductive electrode structure according to the present invention effectively avoids the side etching 15 that will very possibly occur in the process of forming the conventional conductive electrodes 10, and ensures the conducting circuit of the conductive electrode structure can maintain uniform width to thereby largely increase the yield rate of the conductive electrode structure.

However, since the first blackened layer 5 and the weatherproof layer 6 are formed of an easily etched material and an etch-resistant material, respectively, the weatherproof layer 6 must have a designed thickness smaller or extremely smaller than that of the first blackened layer 5 for them to have the same etching rate during the wet-etching process.

Figure 6:
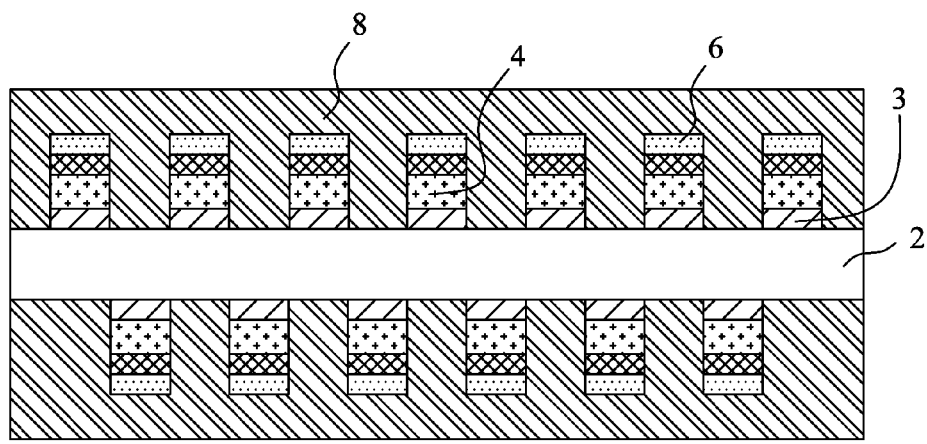
FIG. 6 is a structural view of the conductive electrode structure of the present invention after being covered with an optically clear adhesive film.

Please refer to FIG. 6. A further step (G) can be performed after the step (F): Deliver the preliminary conductive electrode structure to related destinations for other subsequent processes, and thereafter, coat or attach an optically clear adhesive (OCA) film 8 on or to the preliminary conductive electrode structure to completely cover and seal the conductive electrode structure formed on the substrate layer 2, so as to provide a protection means to the completed conductive electrode structure. The optically clear adhesive film 8 can be made of silicone or acrylic resin.

Further, since the weatherproof layer 6 is configured to have a dark color to provide blackening effect, it indirectly prevents the conductive electrode layer 4 from being easily visually perceived by users and also effectively reduces the interference phenomenon of the moiré effect, making the touchscreen using same more comfortable for viewing.

According to the present invention, the conductive electrode structure is completely enclosed in the optically clear adhesive film 8, and the optically clear adhesive film 8 forms an almost flat and smooth surface on the substrate layer 2 without leaving any clearance between it and the circuit pattern formed of the conductive electrode layer 4.

Further, when viewing from a top of the conductive electrode structure of the present invention completed through the above steps, the conductive electrode layer 4 presenting the circuit pattern forms a grid-shaped conducting circuit.

Figure 3:
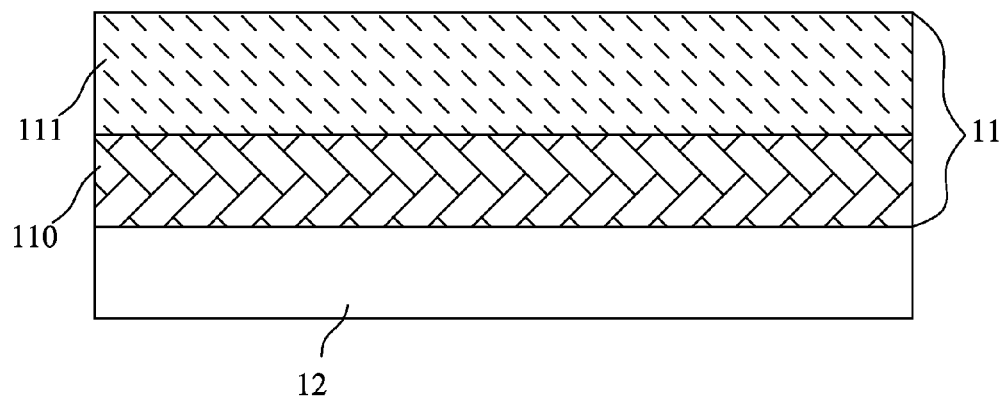
FIG. 3 is a sectional view of an adhesion layer for the conventional conductive electrodes manufactured according to the method of FIG. 1.
Figure 7:
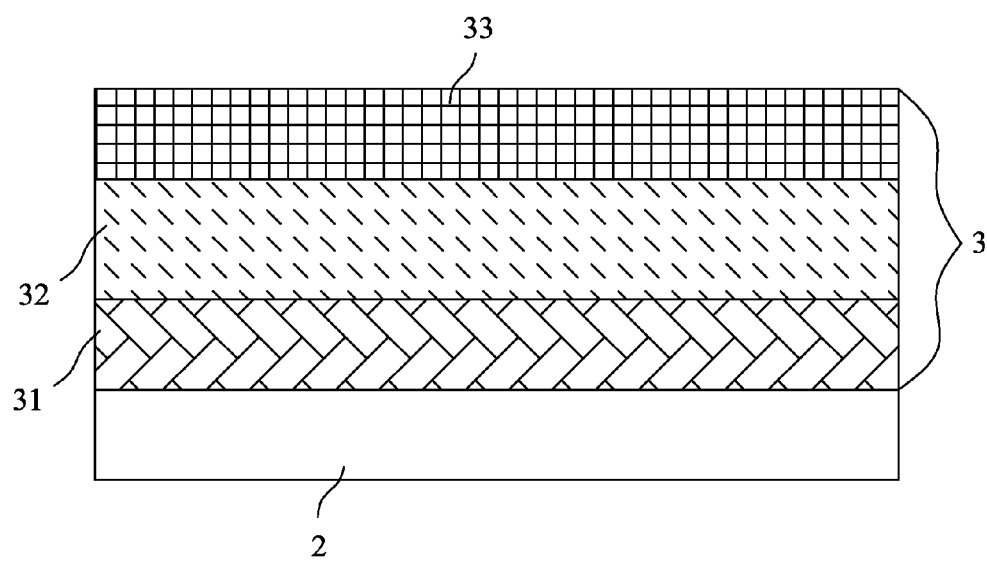
FIG. 7 is a structural view of a first embodiment of an adhesion layer included in the conductive electrode structure of the present invention.

Please refer to FIG. 7 that is a structural view showing a first embodiment of the adhesion layer 3 for the conductive electrode structure of the present invention. Compared to the conventional adhesion layer 11 having two sublayers as shown in FIG. 3, the adhesion layer 3 of the present invention according to the first embodiment thereof includes three sublayers sequentially deposited on the substrate layer 2 through a sputtering process, namely, an intermediate layer 31, an electrically conductive seed layer 32, and an anti-oxidation layer 33. More specifically, to form the adhesion layer 3, first deposit the intermediate layer 31 on the substrate layer 2, then deposit the seed layer 32 on the intermediate layer 31, and finally deposit the anti-oxidation layer 33 on the seed layer 32.

Figure 8:
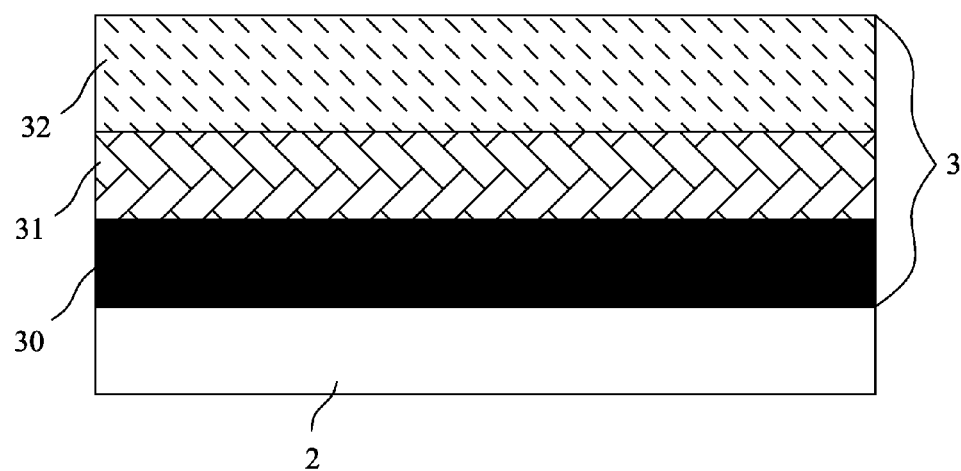
FIG. 8 is a structural view of a second embodiment of the adhesion layer included in the conductive electrode structure of the present invention.

FIG. 8 is a structural view showing a second embodiment of the adhesion layer 3 for the conductive electrode structure of the present invention. The adhesion layer 3 according to the second embodiment thereof also includes three sublayers sequentially deposited on the substrate layer 2 through a sputtering process, namely, a second blackened layer 30, an intermediate layer 31 and an electrically conductive seed layer 32. More specifically, to form the adhesion layer 3, first deposit the second blackened layer 30 on the substrate layer 2, then deposit the intermediate layer 31 on the second blackened layer 30, and finally deposit the seed layer 32 on the intermediate layer 31.

Figure 9:
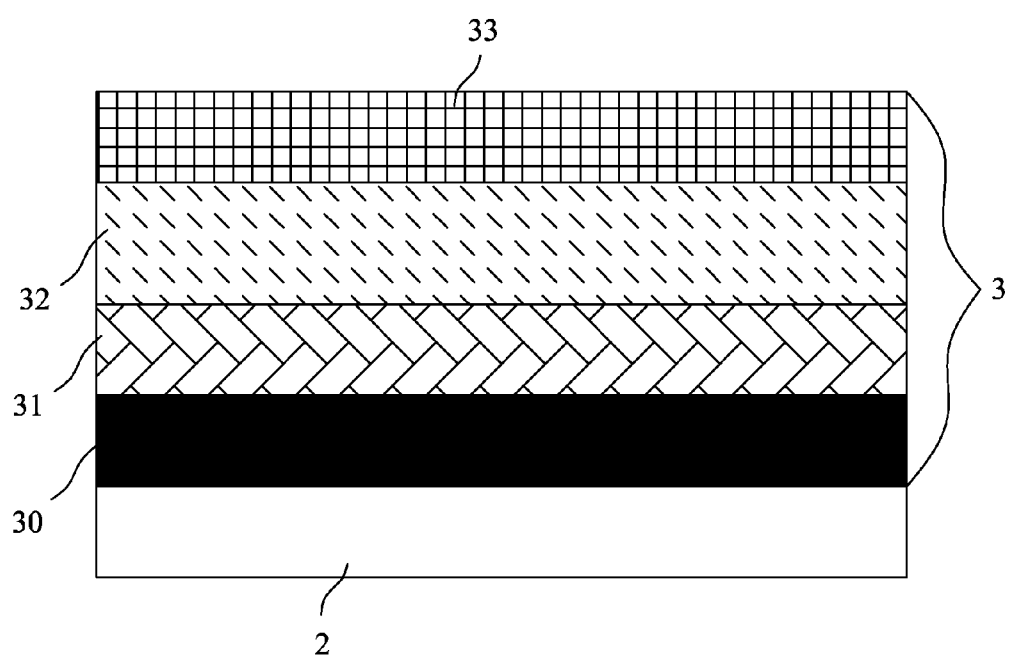
FIG. 9 is a structural view of a third embodiment of the adhesion layer included in the conductive electrode structure of the present invention.

FIG. 9 is a structural view showing a third embodiment of the adhesion layer 3 for the conductive electrode structure of the present invention. The adhesion layer 3 according to the third embodiment thereof includes four sublayers sequentially deposited on the substrate layer 2 through a sputtering process, namely, a second blackened layer 30, an intermediate layer 31, an electrically conductive seed layer 32, and an anti-oxidation layer 33. More specifically, to form the adhesion layer 3, first deposit the second blackened layer 30 on the substrate layer 2, then deposit the intermediate layer 31 on the second blackened layer 30 and deposit the seed layer 32 on the intermediate layer 31, and finally deposit the anti-oxidation layer 33 on the seed layer 32.

In the second and the third embodiment thereof, the adhesion layer 3 further includes a second blackened layer 30 deposited on the substrate layer 2. The second blackened layer 30 is formed of an electrically conductive metal oxide material or an anti-corrosion metal oxide material, and has a thickness ranged from 5 nm to 0.1 μm.

In other words, the second blackened layer 30 is formed of a material usually having a relatively dark color, such as a color close to blue, green, purple, brown or black, to facilitate absorption of light reflected or refracted from a product, i.e. a touchscreen. Therefore, the second blackened layer 30 indirectly prevents the conductive electrode layer 4 from being easily visually perceived by a user who is using the touchscreen. The second blackened layer 30 also effectively reduces the interference phenomenon of the moiré effect, making the touchscreen more comfortable for viewing.

The intermediate layer 31 is also referred to as a tie-coat layer, and functions to bond the second blackened layer 30 to the seed layer 32 that is easily oxidized. Conventionally, there are three ways to avoid oxidation of the seed layer 32.

In the first way, an acid solution is used to remove the oxidized seed layer 32. In the second way, the seed layer 32 is temporarily freeze-dried or stored at low temperature and low humidity and then must be used within 12 to 24 hours. In the third way, the seed layer 32 is stored under vacuum and then must be used within 3 to 6 months. In the present invention, however, an anti-oxidation layer 33 is deposited on the seed layer 32 to prevent the latter from oxidizing.

According to the conductive electrode structure of the present invention, the adhesion layer 3 has a thickness ranged between 0.01 μm and 1 μm; the conductive electrode layer 4 has a thickness ranged between 0.1 μm and 6 μm; and the weatherproof layer 6 has a thickness ranged between 2 nm and 50 nm.

Figure 2:
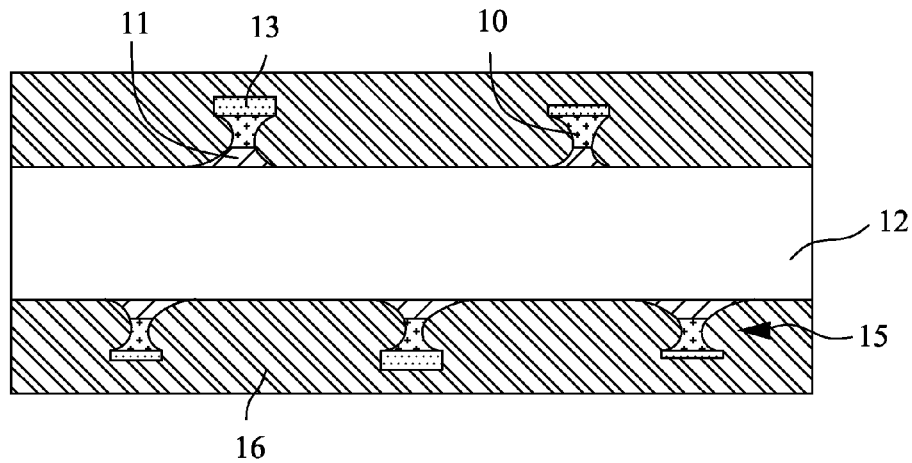
FIG. 2 is a sectional view showing the conventional conductive electrodes are covered by an optically clear adhesive (OCA) film.

Unlike the structure of the conventional metal conductive electrodes 10 shown in FIGS. 1 to 3, the conductive electrode structure according to the preferred embodiment of the present invention has a first blackened layer 5 formed on the conductive electrode layer 4 and a second blackened layer 30 included in the adhesion layer. The first blackened layer 5 located on a first side of the substrate layer 2 and the second blackened layer 30 located on an opposite second side of the substrate layer 2 are arranged in a staggered relation, so that a user using a touchscreen having the conductive electrode structure of the present invention would first see the first blackened layer 5 on the first side of the substrate layer 2, and then sees the second blackened layer 30 on the second side of the substrate layer 2 only when external light passes through the gaps between the adjacent first blackened layers 5 on the first side the substrate layer 2 to reach at the second blackened layer 30 on the second side of the substrate layer 2. Unlike a touchscreen with the conventional metal conductive electrodes 10, with which a user will directly perceive the metal conductive electrodes 10 formed on the second side of the substrate 12 via the gaps between the metal conductive electrodes 10 formed on the first side of the substrate 12, the conductive electrode structure of the present invention provides a complete shielding effect so that a user would not visually perceive the conductive electrode layer 4 formed on the second side of the substrate layer 2. Further, the weatherproof layer 6 for the present invention is also configured to have a relatively dark color to provide the blackening effect. Therefore, the conductive electrode structure of the present invention largely reduces the moiré effect and avoids the conductive electrode layer 4 on the second side of the substrate layer 2 from being visually perceived by the user who is operating a touchscreen formed of the conductive electrode structure of the present invention.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A conductive electrode structure, comprising:
   a substrate layer;
   at least one adhesion layer being formed on the substrate layer for forming a circuit pattern;

a conductive electrode layer being formed on the adhesion layer for forming a conducting circuit corresponding to the circuit pattern;

a first blackened layer being formed on the conductive electrode layer corresponding to the circuit pattern, and being manufactured with an easily etched material; and a weatherproof layer being formed on the first blackened layer and having a thickness smaller than that of the first blackened layer, and being manufactured with an etch-resistant material;

wherein the material for manufacturing the first blackened layer has a dark color, so that light is absorbed by the first blackened layer and stopped from entering into the conductive electrode layer, and accordingly, the first blackened layer forms a shielding surface that prevents the conductive electrode layer from being directly visually perceived by a user.

2. The conductive electrode structure as claimed in claim 1, wherein the weatherproof layer is manufactured with an etch-resistant material having a dark color to thereby form a further shielding surface that prevents the conductive electrode layer from being directly visually perceived by a user.

3. The conductive electrode structure as claimed in claim 1, wherein the conducting circuit presents a grid-shaped structure.

4. The conductive electrode structure as claimed in claim 1, wherein the adhesion layer includes an intermediate layer formed on the substrate layer, an electrically conductive seed layer formed on the intermediate layer, and an anti-oxidation layer formed on the seed layer.

5. The conductive electrode structure as claimed in claim 1, wherein the adhesion layer includes a second blackened layer formed on the substrate layer, an intermediate layer formed on the second blackened layer, and an electrically conductive seed layer formed on the intermediate layer.

6. The conductive electrode structure as claimed in claim 1, wherein the adhesion layer includes a second blackened layer formed on the substrate layer, an intermediate layer formed on the second blackened layer, an electrically conductive seed layer formed on the intermediate layer, and an anti-oxidation layer formed on the seed layer.

7. The conductive electrode structure as claimed in claim 1, wherein the adhesion layer is formed of a material selected from the group consisting of a metal material, a metal oxide material, a polymeric material, and any composite material thereof.

8. The conductive electrode structure as claimed in claim 7, wherein the metal material for forming the adhesion layer is selected from the group consisting of tungsten (W), nickel (Ni), chromium (Cr), copper (Cu), vanadium (V), molybdenum (Mo), tin (Sn), zinc (Zn), cobalt (Co), iron (Fe), titanium (Ti), niobium (Nb), aluminum (Al), and any alloy thereof; and wherein the metal oxide material for forming the adhesion layer is selected from the group consisting of an oxide of tungsten, nickel, chromium, copper, vanadium, molybdenum, tin, zinc, cobalt, iron, titanium, niobium, aluminum, and any alloy thereof.

9. The conductive electrode structure as claimed in claim 1, wherein the weatherproof layer is formed of a material selected from the group consisting of graphite, a metal material, a metal oxide material, an electrically conductive polymeric material, and any composite material thereof.

10. The conductive electrode structure as claimed in claim 9, wherein the metal material for forming the weatherproof layer is selected from the group consisting of tungsten (W), nickel (Ni), chromium (Cr), copper (Cu), aluminum (Al), silver (Ag), titanium (Ti), molybdenum (Mo), tin (Sn), zinc (Zn), cobalt (Co), iron (Fe), niobium (Nb), and any alloy thereof; and wherein the metal oxide material for forming the weatherproof layer is selected from the group consisting of an oxide of tungsten, nickel, chromium, copper, aluminum, sliver, titanium, molybdenum, tin, zinc, cobalt, iron, niobium, and any alloy thereof.

11. The conductive electrode structure as claimed in claim 1, wherein the adhesion layer has a thickness ranged between 0.01 μm and 1 μm; the conductive electrode layer has a thickness ranged between 0.1 μm and 6 μm; the weatherproof layer has a thickness ranged between 2 nm and 50 nm; and the first blackened layer has a thickness ranged between 0.01 μm and 1 μm.

* * * * *